(12) United States Patent
Hartmann et al.

(10) Patent No.: US 10,359,132 B2
(45) Date of Patent: Jul. 23, 2019

(54) PRESS FITTING FOR A THREADED CONNECTION AND METHOD FOR ATTACHING A FITTING TO A THREADED CONNECTION

(71) Applicant: Viega Technology GmbH & Co. KG, Attendorn (DE)

(72) Inventors: Anton Hartmann, Attendorn (DE); Burkhard Henschel, Lennestadt (DE); Benedikt Wiethoff, Niedersalwey (DE); Tobias Koch, Herborn (DE); Ralf Halbe, Wenden-Hillmicke (DE); Ulrich Arning, Attendorn (DE); Andreas Muller, Freudenberg (DE); Christian Becker, Plettenberg (DE); Frank Kasperkowiak, Attendorn (DE); Reiner Mester, Lennestadt (DE); Peter Massow, Hilchenbach (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 727 days.

(21) Appl. No.: 14/908,753

(22) PCT Filed: Jun. 30, 2014

(86) PCT No.: PCT/EP2014/063837
§ 371 (c)(1),
(2) Date: Jan. 29, 2016

(87) PCT Pub. No.: WO2015/014557
PCT Pub. Date: Feb. 5, 2015

(65) Prior Publication Data
US 2016/0238167 A1    Aug. 18, 2016

(30) Foreign Application Priority Data

Jul. 31, 2013    (DE) .................. 10 2013 108 201

(51) Int. Cl.
*F16L 13/14*    (2006.01)
*B65G 39/12*    (2006.01)
(Continued)

(52) U.S. Cl.
CPC .......... *F16L 13/142* (2013.01); *B65G 39/125* (2013.01); *F16L 13/147* (2013.01);
(Continued)

(58) Field of Classification Search
CPC ....... F16L 13/142; F16L 15/08; F16L 13/168; F16L 13/148; F16L 13/147; F16L 15/04; B65G 39/125; Y10T 29/49863
See application file for complete search history.

(56) References Cited

U.S. PATENT DOCUMENTS 2,380,690 A    7/1945    Graham
2,631,871 A    3/1953    Stone
(Continued)

FOREIGN PATENT DOCUMENTS

BE           884150 A2    11/1980
CN          1212750 A     3/1999
(Continued)

*Primary Examiner* — Sarang Afzali
*Assistant Examiner* — Ruth G Hidalgo-Hernandez
(74) *Attorney, Agent, or Firm* — The Webb Law Firm

(57) ABSTRACT

A fitting for attaching to a threaded connection of a pipe, in particular a water pipe, includes a basic body, a threaded portion, and a sealing body arranged on the threaded portion. The basic body has a pressing surface on the side situated opposite to the threaded portion. Also disclosed is a method for attaching a fitting to a threaded connection of a pipe.

15 Claims, 11 Drawing Sheets

(51) Int. Cl.
*F16L 13/16* (2006.01)
*F16L 15/08* (2006.01)
*F16L 15/04* (2006.01)

(52) U.S. Cl.
CPC ........... *F16L 13/148* (2013.01); *F16L 13/168* (2013.01); *F16L 15/08* (2013.01); *F16L 15/04* (2013.01); *Y10T 29/49863* (2015.01)

(56) References Cited

U.S. PATENT DOCUMENTS

| | | |
|---|---|---|
| 2,926,029 A | 2/1960 | St. Clair et al. |
| 4,328,982 A | 5/1982 | Christianson |
| 4,703,959 A | 11/1987 | Reeves et al. |
| 4,969,671 A | 11/1990 | Gross et al. |
| 5,931,511 A | 8/1999 | DeLange et al. |
| 6,059,338 A | 5/2000 | Diederichs |
| 2004/0069498 A1 | 4/2004 | Simpson et al. |
| 2004/0090068 A1 | 5/2004 | Evans et al. |
| 2006/0208488 A1 | 9/2006 | Costa |
| 2007/0128912 A1 | 6/2007 | Glaze et al. |
| 2009/0146418 A1 | 6/2009 | Noto et al. |

FOREIGN PATENT DOCUMENTS

| | | |
|---|---|---|
| CN | 2474865 Y | 1/2002 |
| CN | 2620809 Y | 6/2004 |
| DE | 29715593 U1 | 2/1998 |
| DE | 102004031247 A1 | 4/2005 |
| DE | 602004003807 T2 | 10/2007 |
| EP | 1626217 A1 | 2/2006 |
| WO | 8203901 A1 | 11/1982 |
| WO | 2006115417 A1 | 11/2006 |

PRESS FITTING FOR A THREADED CONNECTION AND METHOD FOR ATTACHING A FITTING TO A THREADED CONNECTION

CROSS-REFERENCE TO RELATED APPLICATIONS

This application is the United States national phase of International Application No. PCT/EP2014/063837 filed Jun. 30, 2014, and claims priority to German Patent Application No. 102013108201.7 filed Jul. 31, 2013, the disclosures of which are hereby incorporated in their entirety by reference.

BACKGROUND OF THE INVENTION

Field of the Invention

The invention relates to a fitting for attaching to a threaded connection of a pipe, in particular a water pipe, with a base body, with a threaded portion and with a sealing body arranged on the threaded portion. The invention also relates to a method for attaching a fitting to a threaded connection of a pipe.

When pipes are being newly installed or existing ones repaired, in particular when installing domestic drinking water or heating pipes, it is frequently necessary to create threaded unions. Normally tapered threads are used here. After a few turns the nominal diameter of the tapered thread corresponds to that of the cylindrical mating thread. With further tightening the threads become jammed thereby creating a metallic seal. Nevertheless, such Whitworth pipe threads, or "R-threads" are also provided prior to being screwed together with sealants such as Teflon or hemp, in order to fill the remaining gaps, and to ensure a reliable and permanent seal.

This type of installation is time consuming and, because of the use of a separate sealant or sealing paste, there are sometimes hygiene issues. In addition, the sealants are regularly introduced or applied manually, meaning that there may be inconsistencies in the seal. Furthermore, when the connection is created with tools, for example with a screw-wrench or pipe wrench, high torques are in part introduced into the connection. Thus when creating a threaded connection between various components and the pipe system, damage can be caused to the threads or the components. On top of this, once installed leak testing of threaded connections by the craftsman is time consuming. Such components can for example be the inlets to or outlets from hot water tanks, heating boilers, armatures, filters or valves.

Essentially the fittings described can be used for pipes with liquid or gaseous fluids. Where in the following the invention is described on the basis of water pipes, this should not be understood in a restrictive sense.

The technical problem for the invention is to simplify the attachment of a fitting to a threaded connection of a pipe or an armature and to configure the attachment to be more reliable at the same time.

SUMMARY OF THE INVENTION

The abovementioned problem is solved by a device of the type mentioned in the introduction, in that the base body has a pressing surface on the side situated opposite to the threaded portion.

With the fitting according to the invention the base body can be pressed into the mounted state using a pressing tool already known. By pressing the base body in the area of the pressing surface the sealing body is pressed against the thread of the threaded connection and the threaded portion of the fitting, so that a reliable seal between the fitting and the threaded connection is achieved. The fitting then has on the end opposite the threaded portion by way of example a press fitting profile known per se, in order to be able to connect a further pipe thereto.

Since the seal between the fitting and the threaded connection is achieved only after pressing, the thread of the threaded portion can be mounted on the threaded connection without introducing particular force. This is because a reliable seal by mounting alone is unnecessary. Pressing of the fitting then takes place mainly radially, so that the pipe connected to the threaded connection is not stressed, or only to a limited extent.

As a result of the invention, damaged or untight threaded connections can be avoided, time consuming work stages saved, consequential damage from defective processing avoided and hygienically safe sealants used, for example in drinking water installations. At the same time a high resistance to torsion, high resistance to extraction and a high leak tightness are achieved. In this way, the advantages of a threaded connection are combined with the advantages of a pressed connection.

The invention is primarily used for Whitworth pipe threads, or R-threads, but is not restricted to use with tapered threads. The invention can also be used with other threads, such as cylindrical threads. In addition, the fitting described can basically be used for all thread diameters. The fitting is primarily used, however, in the normal threaded connections in domestic installations, which are in the range 0.25 to 1.5 inches.

By using prefabricated fittings for threaded connections, including a factory-fitted seal, short assembly times and high quality of the connection created are achieved. In addition, it is advantageous if the threaded connection in the first stage of assembly is not yet pressed and can thus still be aligned. This allows the pipe connection to be pre-installed and aligned first, and only then pressed and thus fixed.

The base body can be made from the known materials of stainless steel, steel, copper, copper alloys, other metals or a plastic such as for example ethylene-propylene-diene-monomer (EPDM), hydrogenated nitrile butadiene rubber (HNBR), fluorocarbon rubber (FKM), silicon, polyurethane (PU) or chlorobutyl rubber. The base body can basically be made by forming, so that expensive machining can be avoided. The sealing body can be made from a soft material such as plastic in particular from thermally stable plastics such as polytetrafluorethylene (PTFE), polyethersulfone (PES), polyarylsulfone (PPSU) or also subsequently cross-linked plastic materials as polyethylene (PEX) or cross-linked elastomers.

In a preferred configuration of the invention the threaded portion has a thread comprising at least partially the material of the base body. Thus the base body of the fitting with its threaded portion itself forms at least part of the thread which is mounted on a threaded connection of a pipe. The sealing body is then disposed in the threaded portion in such a manner that after the base body is mounted, at least the thread of the threaded portion itself and possibly also the sealing body are in contact with the thread of the threaded connection. Similarly, the sealing body can be disposed just in the area of the thread of the threaded connection, without being in contact with it. By pressing the threaded portion, the sealing body is then pressed into the thread turns of the threaded connection and the desired permanent seal is achieved between the fitting and the threaded connection.

In addition, it is further preferred that the threaded portion has a circumferential groove to accommodate the sealing body. Thus the sealing body is delimited on both sides in each case by a part of the thread of the threaded portion. The sealing body thus has a defined position within the threaded portion providing it with axial stability when the fitting is mounted.

Basically, the sealing body can have various designs. Preferably the sealing body has a cord-like design and extends circumferentially at least along one turn, preferably along at least two turns of the thread to be sealed of the threaded connection. Here the cord-like sealing body itself preferably takes the form of a turn, so that the sealing body during mounting of the fitting on the threaded connection comes to rest in a fixed position against its thread.

In addition, the sealing body can have a cylindrical basic form and extend axially along at least one turn, preferably along at least two turns of the thread to be sealed of the threaded connection. This configuration has the advantage that the sealing body has high axial stability. In this form the sealing body can have a purely cylindrical form or similarly at least partially be provided with a thread.

In an alternative configuration of the fitting according to the invention the threaded portion can have a recess to accommodate the sealing body, wherein the sealing body forms the thread. The recess holds the sealing body on the base body and gives it axial stability. Since the sealing body itself, and not the material of the base body, forms the thread, it is preferred that the sealing body is secured against rotation in relation to the base body. During mounting of the fitting, the thread of the sealing body then engages with the thread of the threaded connection, in order to form a reliable sealed connection following pressing of the threaded portion.

Furthermore, the connection between the thread of the threaded portion and the thread of the threaded connection in the mounted and unpressed state can be untight. In this way, when assembling the pipe system using the abovementioned fitting it is ensured that in a load test, water carried by the pipe or the fluid to be carried emerges from a fitting that has not been pressed. To ensure that the unpressed fitting that has been mounted is untight, in the thread of the threaded portion and/or the sealing body an axial groove or an axial broadening or indentation can for example be provided, which is only closed following pressing. In this way unpressed threaded connections are guaranteed to be untight, so that effort on checking the tightness of the threaded connection following installation is reduced.

The fitting according to the invention and its advantageous configurations as explained above can be used for both an internal thread and an external thread. Here the emphasis is on configuration as an internal thread, since most threaded connections in domestic installation have an external thread. Nevertheless, the invention is not restricted to fittings having an internal thread.

This pressing surface of the base body can be designed to be at least partially circumferential or to extend over the entire circumference. In addition, the pressing surface of the base body is at least partially, preferably completely, adapted to the press profile of a pressing tool to be used. Here the wall thickness in the area of the threaded portion to be pressed is set so that the pressing leads to the necessary deformation of the threaded portion and thus of the sealing body. This allows the use of a pre-existing pressing tool provided for creating pressed connections between fittings and pipes.

In a preferred manner, the pressing surface of the base body can have a substantially cylindrical profile. In this way a simple to create external profile of the pressing surface can be arrived at and simple pressing tools with simple cylindrical or at least partially cylindrical press profiles can be used.

Known pressing tools furthermore have a press profile with a circumferential recess, adapted to a beading of a fitting accommodating a sealing ring. The recess is adjoined on both sides by cylindrical sections and on at least one of the two cylindrical sections by a polygonal profile, preferably a hexagonal profile. The fitting according to the invention can then have a pressing surface of the base body with a circumferential, preferably solid bead. The bead is then pressed by means of the circumferential recess of the pressing tool, while the other cylindrical sections and hexagonal sections of the press profile of the pressing tool during pressing preferably do not come into contact with the pressing surface of the fitting. Thus a known press profile of a conventional pressing tool is used, the measurements and dimensions of which are precisely specified by the recess and can be used for precise pressing of the mounted fitting.

The technical problem shown above is also solved by a method for attaching a fitting to a threaded connection of a pipe, in particular a water pipe, or to an armature, in which a threaded connection is created between a threaded portion of the fitting and the thread of the threaded connection, in which a sealing body disposed on the threaded portion is positioned at least partially in the area of the thread of the threaded connection and in which the base body is pressed on the side of the base body radially opposite to the threaded portion on a pressing surface.

Thus the base body can be pressed in the mounted state and the sealing body pressed against the thread of the threaded connection and against the threaded portion, as already explained above using the fitting.

The method according to the invention simplifies the handling by the craftsman, as the fitting can be mounted on the threaded connection without application of force, and without yet producing a fixed seal. Only after subsequent pressing through the introduction of a predominantly radial pressing force, a fixed and sealed connection is created. In doing so, no excessive torsional force is introduced into the connection by a tight screwing action.

In a first configuration of the method according to the invention the thread of the threaded portion is an internal thread and the threaded portion is pressed radially inwards with a crimping tool. For this, previously known and commercially available pressing tools or crimping tools can be used. The external profile of the threaded portion, forming the pressing surface, is to this end adapted to the press profile of the pressing tool, so that a special design of pressing tool is unnecessary.

In a second configuration of the method according to the invention the thread of the threaded portion is an external thread and the threaded portion is pressed radially outwards with an expansion tool. For this, the fitting can be mounted with an expansion tool deployed comprising an expansion sleeve and an expansion die. Then the expansion sleeve is expanded outwards by withdrawing the expansion die outwards, in order to expand the threaded portion outwards. In this way the sealing body is pressed with the inner thread of the threaded connection and the threaded portion of the fitting forming a reliable seal.

BRIEF DESCRIPTION OF THE DRAWINGS

In the following the invention is described in more detail using embodiments, to which end reference is made to the attached drawing. The drawing shows as follows.

DETAILED DESCRIPTION OF THE INVENTION

FIGS. 1 to 4 show a first embodiment of a fitting 10 according to the invention for attaching to a threaded connection 12 of a pipe 14, which in particular can be a water pipe.

Figure 1:
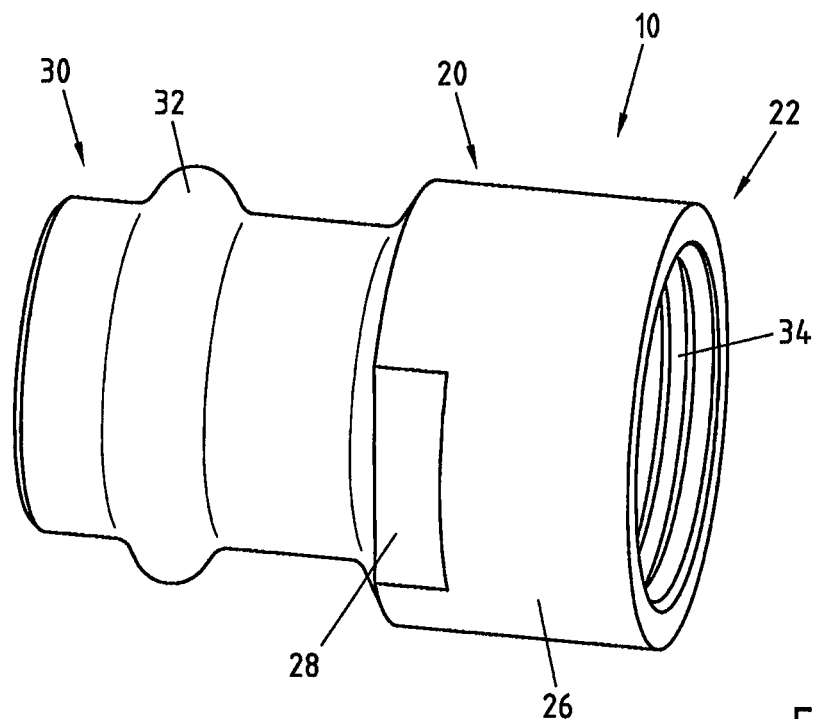
FIG. 1 a first embodiment of a fitting according to the invention with a threaded portion with internal thread in a perspective view.
Figure 2:
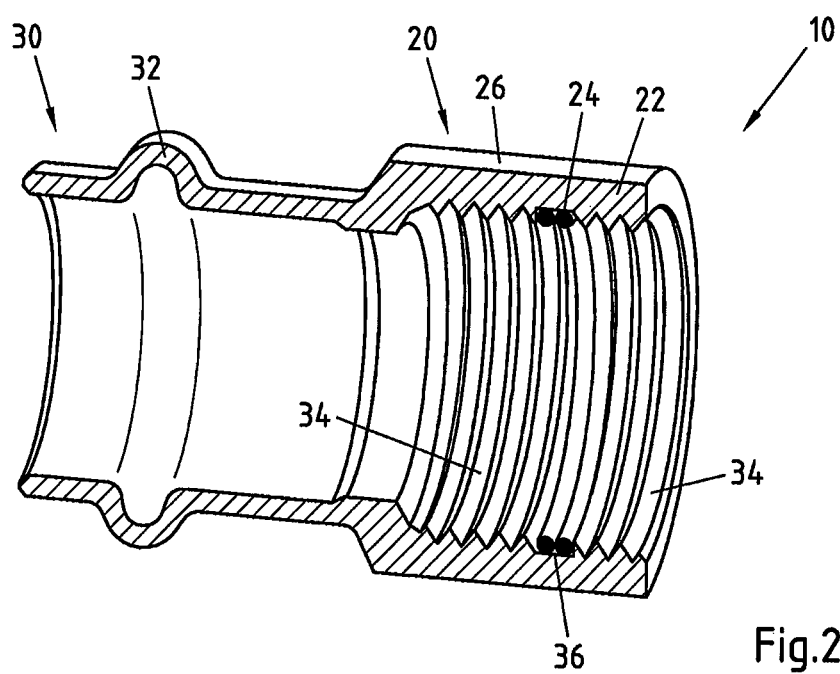
FIG. 2 the fitting from FIG. 1 in a sectional perspective view.

As shown by FIGS. 1 and 2, the fitting 10 has a base body 20, a threaded portion 22 and a sealing body 24 disposed on the threaded portion 22. In addition, the base body 20 has a pressing surface 26 on the side situated radially opposite to the threaded portion 22. The pressing surface 26 has a cylindrical design. The base body 20 furthermore has flattened sections 28 for the application of screw-wrenches when mounting the fitting 10.

On the end section 30 situated opposite to the threaded portion 20, the fitting 10 has a conventional bead 32 to accommodate a circular sealant. The end section 30 can thus be used for a conventional pressed connection with a connecting pipe. The precise configuration of the press fitting at the end section 30 is not important for this invention. Instead of a further pressed connection, fitting 10 can also lead as one piece directly into a pipe of a specified length or into an armature, a T-piece or a crosspiece.

FIGS. 1 and 2 show that the threaded portion 22 has a thread 34 comprising the material of the base body 20. The thread 34 serves for mounting on the threaded connection 12. Furthermore, the threaded portion 22 has a circumferential groove 36 to accommodate the sealing body 24. The sealing body 24 has a cord-like design and extends on the circumferential side along two turns of the thread 40 to be sealed of the threaded connection 12.

Figure 3:
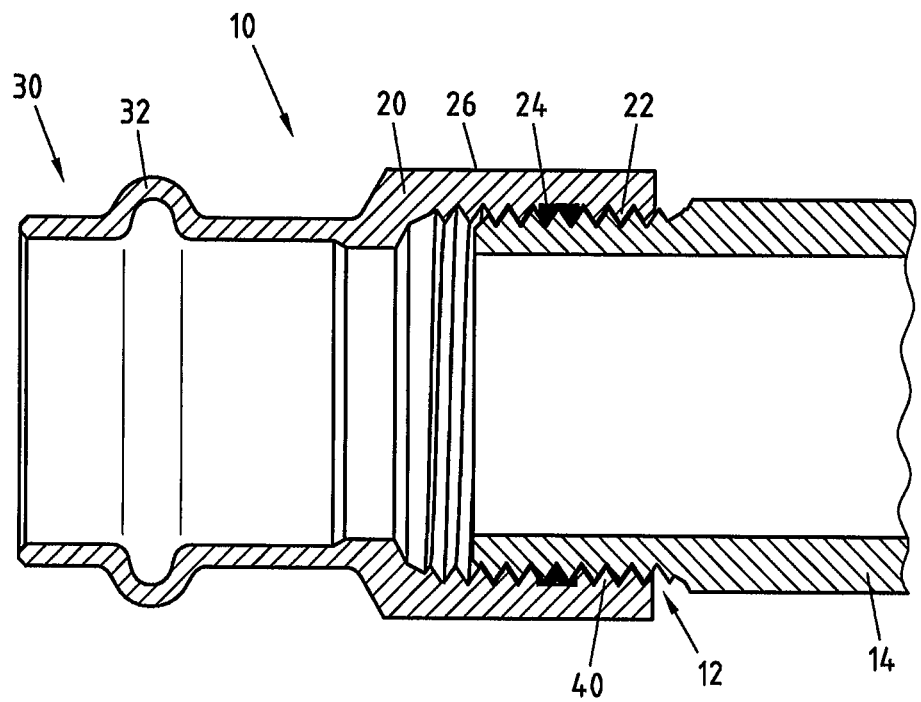
FIG. 3 the fitting from FIG. 1 mounted on a threaded connection in the unpressed state in cross section.

FIG. 3 shows the fitting 10 after mounting on the threaded connection 12 in the unpressed state. The external thread 40 of the threaded connection 12 is in partial engagement both with the thread 34 and the sealing body 24. In this state the connection between the fitting 10 and the threaded connection 12 does not yet have a reliable seal. In the mounted state shown, there is still a small gap between the two threads 34 and 40, identified by a thicker line in FIG. 3. Then the fitting is pressed radially inwards against the pressing surface 26 and the sealing body 24 is thus pressed against the thread 40 of the threaded connection 12.

Figure 4:
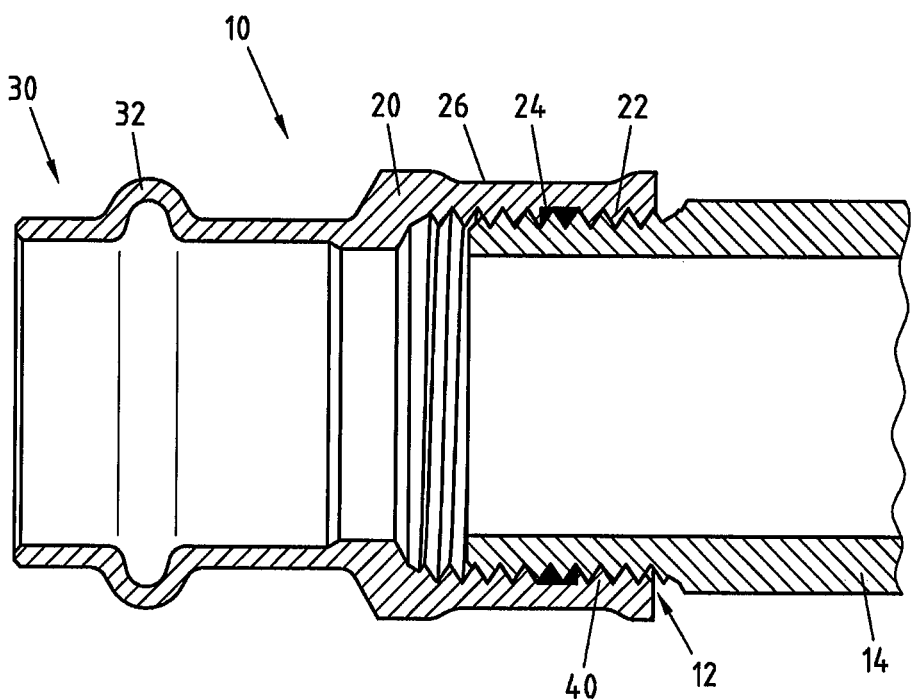
FIG. 4 the fitting from FIG. 1 mounted on a threaded connection in the pressed state in cross section.

The state after pressing is shown in FIG. 4, wherein the changed shape of the threaded portion 22 can be identified. The two threads 34 and 40 are in close abutment to each other. Therefore only by inward radial pressing is a permanent sealed connection between the fitting 10 and the threaded connection 12 completed.

FIGS. 5 to 8 show a second embodiment of the invention. Here the same references denote the same elements as have already been described using FIGS. 1 to 4.

With this embodiment the sealing body 50 has a cylindrical basic form and extends axially along two turns of the thread 40 to be sealed of the threaded connection 12. Here the sealing body 50 is disposed in the groove 36, which has already been described using FIGS. 1 and 2.

Figure 5:
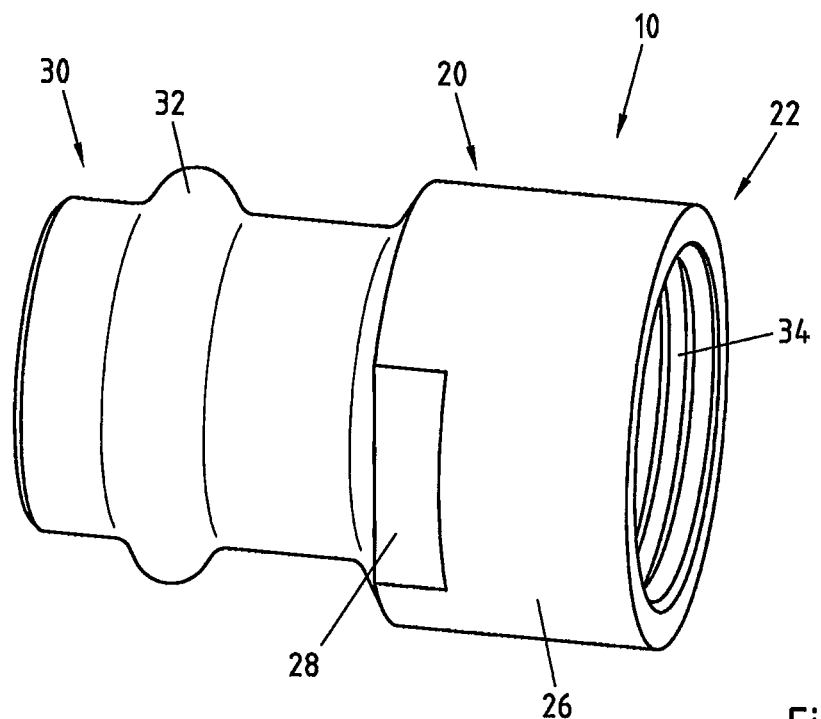
FIG. 5 a second embodiment of a fitting according to the invention with a threaded portion with internal thread in a perspective view.
Figure 6:
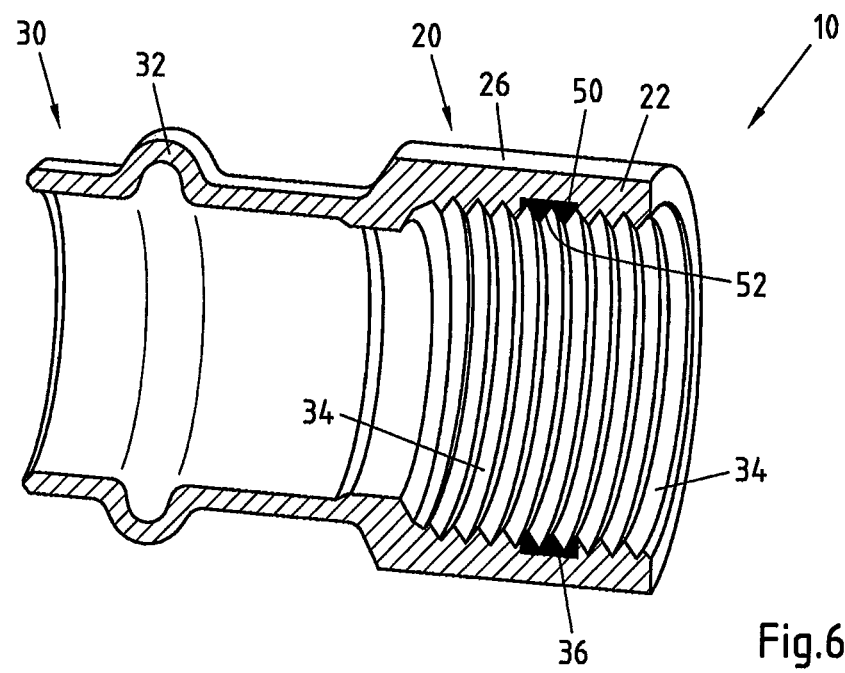
FIG. 6 the fitting from FIG. 5 in a sectional perspective view.
Figure 7:
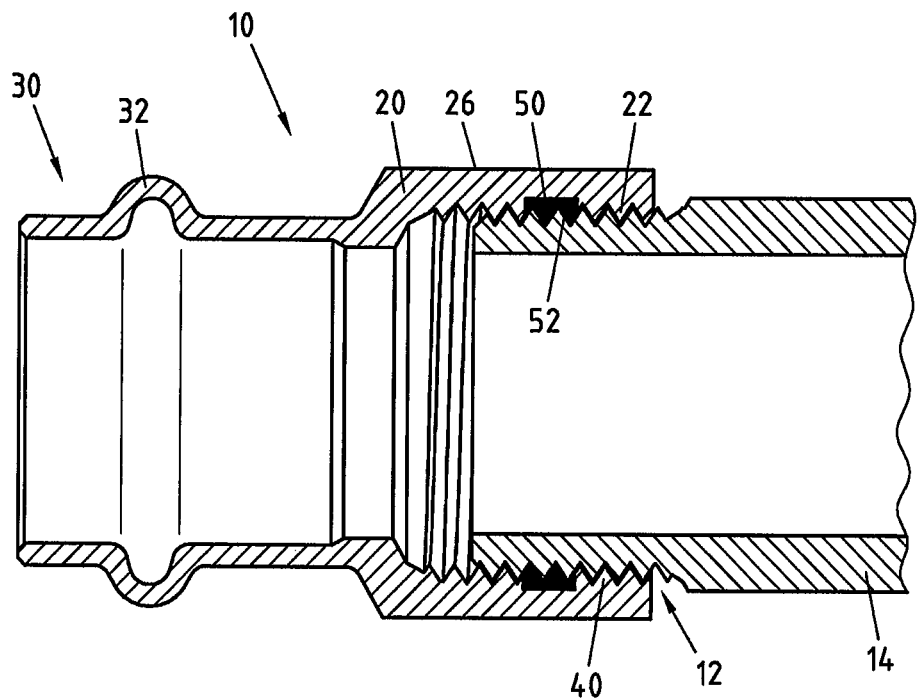
FIG. 7 the fitting from FIG. 5 mounted on a threaded connection in the unpressed state in cross section.
Figure 8:
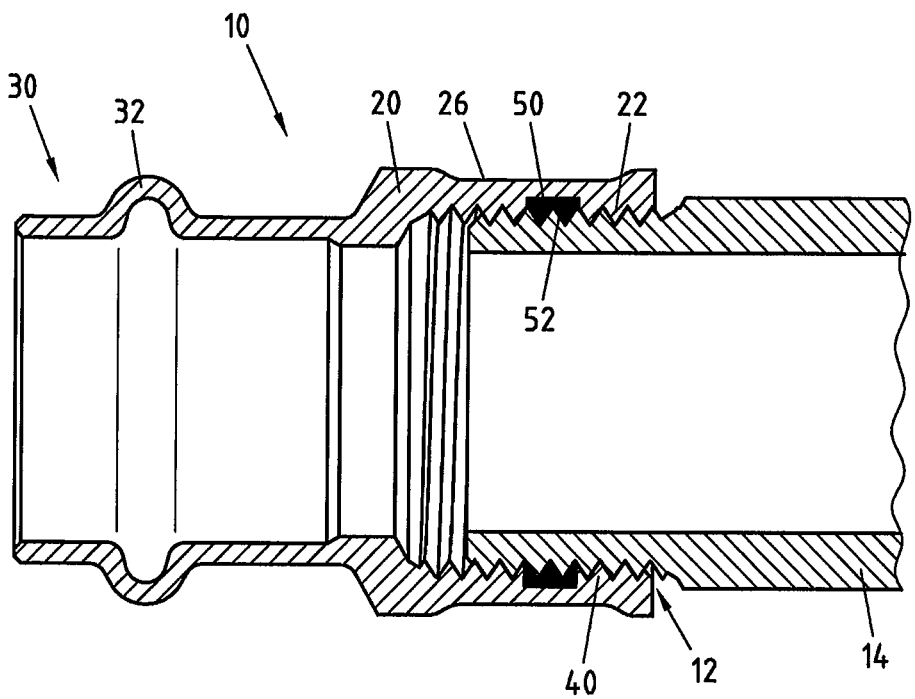
FIG. 8 the fitting from FIG. 5 mounted on a threaded connection in the pressed state in cross section.

As shown in FIGS. 5 and 6, the sealing body 50 is provided with a thread 52, which is mounted in addition to the thread 34 of the threaded portion 22 for mounting on the threaded connection 12. Thus during mounting the sealing body 50 already comes into direct contact with the turns of the thread 40, as shown in FIG. 7. FIG. 8 then again shows the pressed state of the fitting.

As can be seen from FIGS. 2 and 6, the sealing bodies 24 and 50 have a larger internal diameter than the thread 34 of the threaded portion 22. Therefore the respective sealing body 24, 50 is not heavily stressed during mounting and the load of the screwing force to be applied is taken by the thread 34. Inter alia, this prevents the sealing body 24, 50 from tilting or otherwise moving out of its specified position during mounting. Nevertheless, the sealing body 24, 50 comes into contact with, abuts against or otherwise engages with the thread 40 of the threaded connection 12.

FIGS. 9 to 12 show a third embodiment of the invention. Here the same references denote the same elements as have already been described using FIGS. 1 to 4.

Figure 9:
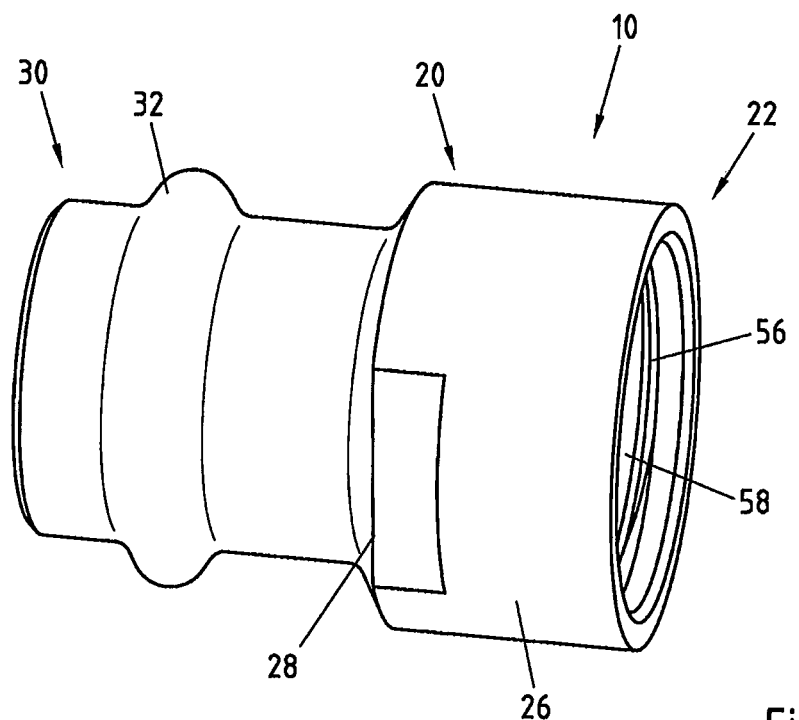
FIG. 9 a third embodiment of a fitting according to the invention with a threaded portion with internal thread in a perspective view.
Figure 10:
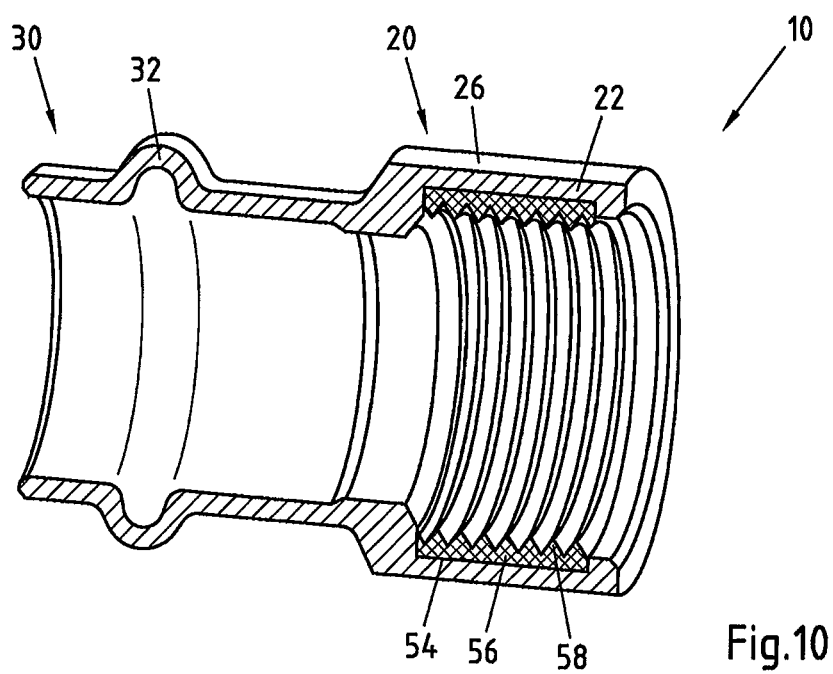
FIG. 10 the fitting from FIG. 9 in a sectional perspective view.
Figure 11:
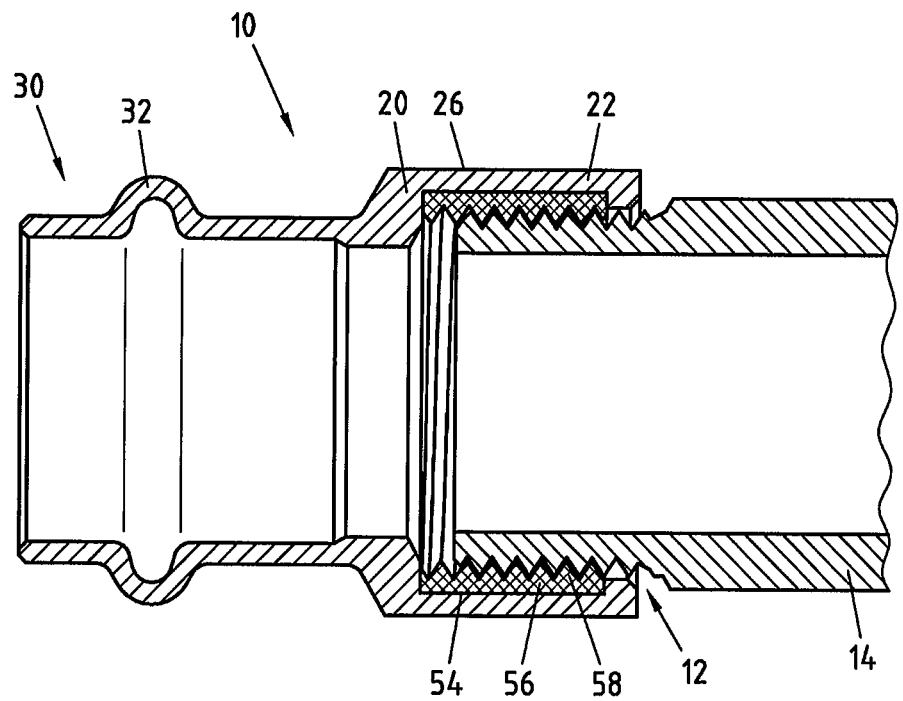
FIG. 11 the fitting from FIG. 9 mounted on a threaded connection in the unpressed state in cross section.

As shown in FIGS. 9 and 10, the threaded portion 22 has a recess 54 to accommodate the sealing body 56. Therefore the threaded portion 22 of the base body 20 does not have the thread for mounting on the threaded connection 12, but the sealing body 56 itself has a thread 58. This thread 58 alone is used for mounting on the threaded connection 12.

A particular advantage of this configuration without thread in the threaded portion 22 of the base body 20 is that the base body 20 can be created by metal forming, so that compared to a machining process for the manufacture of a metal thread a significant cost saving can be achieved.

Figure 12:
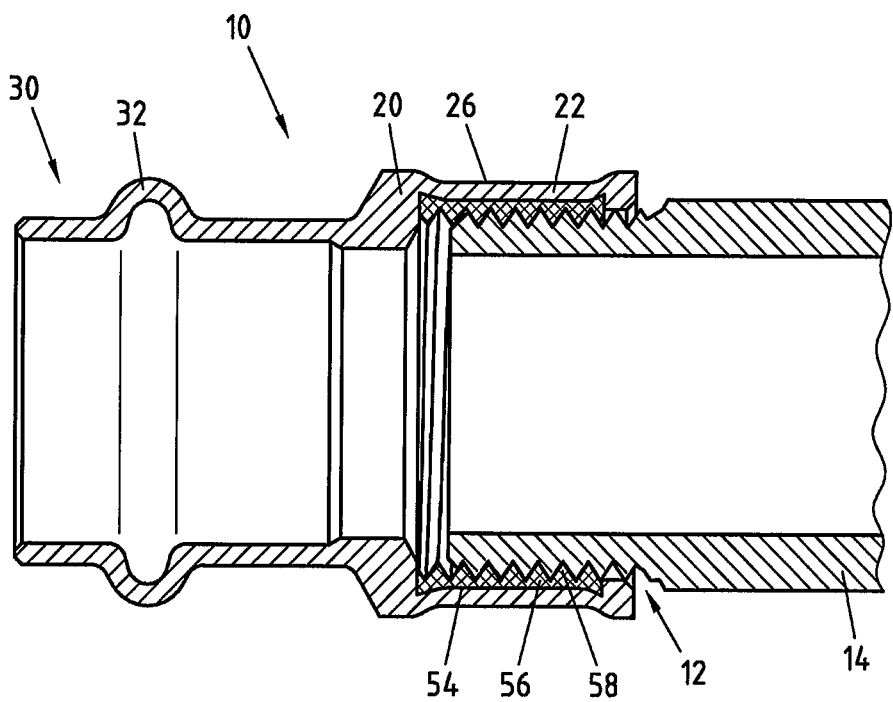
FIG. 12 the fitting from FIG. 9 mounted on a threaded connection in the pressed state in cross section.
Figure 13:
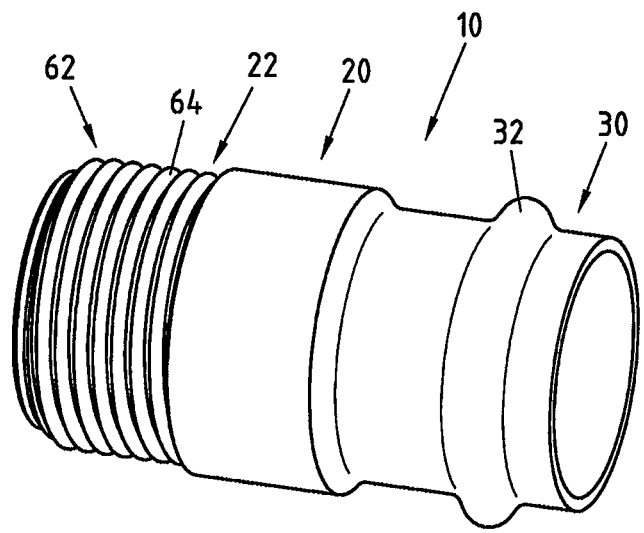
FIG. 13 a fourth embodiment of a fitting according to the invention with a threaded portion with external thread in a perspective view.
Figure 14:
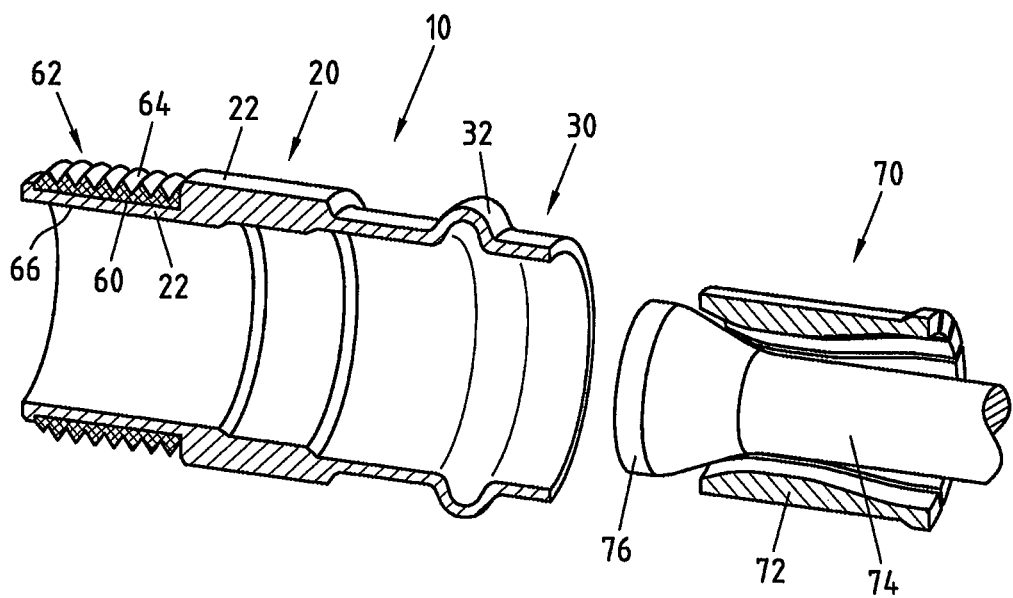
FIG. 14 the fitting from FIG. 13 with expansion tool in a perspective view.

FIG. 11 again shows the mounted but unpressed state, while FIG. 12 shows the state after pressing.

The embodiments according to FIGS. 1 to 12 are designed so that the thread 34, 52 or 58 of the threaded portion 2 is an internal thread and that therefore the threaded portion 22 can be pressed radially inwards with a crimping tool. In this way the transition from unpressed to pressed state of FIGS. 3 to 4, 7 to 8 and 11 to 12 is achieved.

The embodiment according to FIGS. 13 to 17 has a fitting 10 for a threaded connection 12, wherein the threaded connection 12 is provided with an internal thread 42. Here the same references denote the same elements as have already been described using FIGS. 1 to 4.

The base body 20 of the fitting 10 has a threaded portion 22 with an external profile with a circumferential recess 60 and a substantially cylindrical internal profile. In the recess, the sealing body 62 with substantially cylindrical form is positioned, provided on its external side with a thread 64. The fitting 10 is mounted on the external thread 42 of the threaded connection, so that the sealing body 62 is positioned in the area of the thread 42. The sealing body 62 thus has a similar design to the sealing body 56 according to FIGS. 9 to 12. However, it is equally possible to design the sealing body and also the threaded portion similarly to FIGS. 1 to 8.

Then the pressing takes place of the threaded portion 22 against a pressing surface 66 by a substantially radial outward expansion, so that a reliable seal between the fitting 10 and the threaded connection 12 is achieved. This process is further described in the following using FIGS. 15 to 17.

The embodiments of the fitting according to the invention described above can be designed so that the connection between the threads 34, 52, 58; 64 of the threaded portion 22 and the thread 40; 42 of the threaded portion 12 in the mounted and unpressed state is untight. To this end an axial groove or axial broadening in the thread 34, 52, 58; 64 can be provided. This is not shown explicitly in the Figures. The axial groove or axial broadening only deforms and makes a seal through the pressing, whereas prior to pressing an intentional lack of tightness exists, which can be detected in a functional test by the emergence of the water from the connection.

The method according to the invention for attaching a fitting 10 to a threaded connection 12 of a pipe 14 has, as described using FIGS. 1 to 16 the following steps:

mounting or screwing of the fitting 10 with a threaded portion 22 on or into the thread 40 of threaded connection 12 to create a threaded connection, positioning a sealing body 24, 50, 56; 62 disposed on the threaded portion 22 at least partially in the area of the thread 40; 42 of the threaded connection 12 and pressing the base body 20 on the side radially opposite to the threaded portion 22 against a pressing surface 26, 66 in particular in the radial direction.

If the thread 40 of the threaded portion 22 is an internal thread, the threaded portion 22 is pressed radially inwards with a crimping tool. This has already been explained above using FIGS. 1 to 12.

If on the other hand the thread 42 of the threaded portion 22 is an external thread, the threaded portion 22 is pressed radially outwards with an expansion tool 70, as shown in FIGS. 13 to 17.

Figure 15:
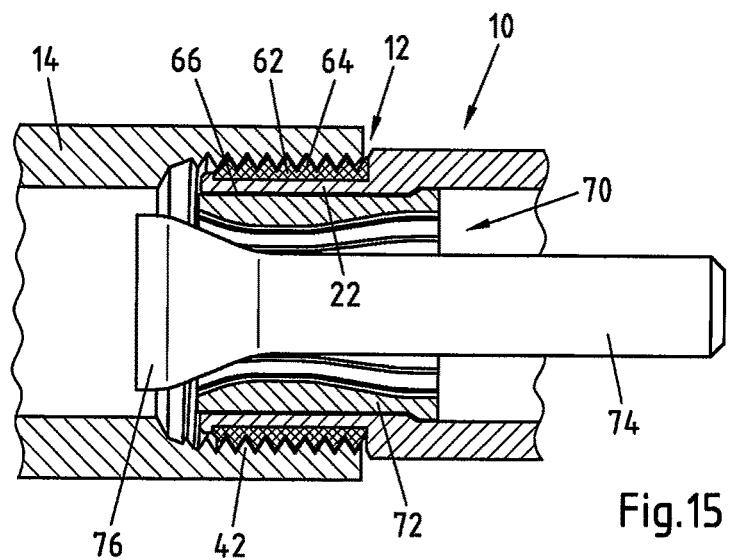
FIG. 15 the fitting from FIG. 13 mounted on a threaded connection in the unpressed state in cross section.
Figure 16:
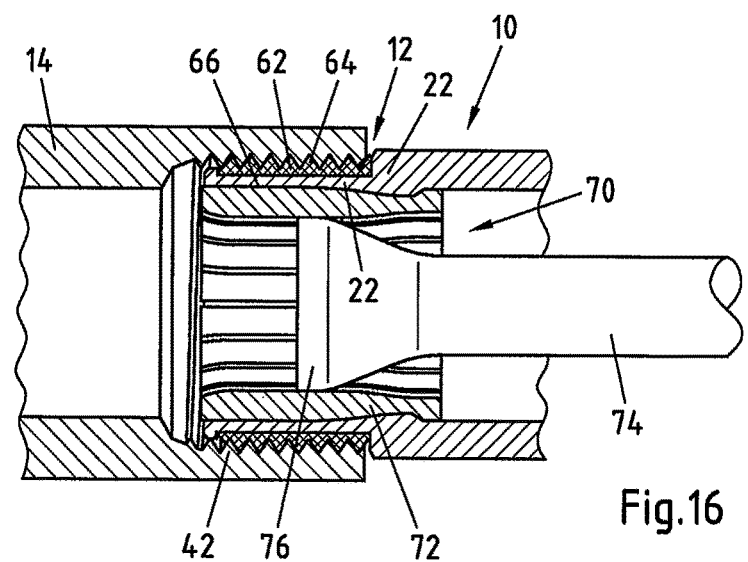
FIG. 16 the fitting from FIG. 13 mounted on a threaded connection in the partially pressed state during withdrawal of the expansion tool in cross section.
Figure 17:
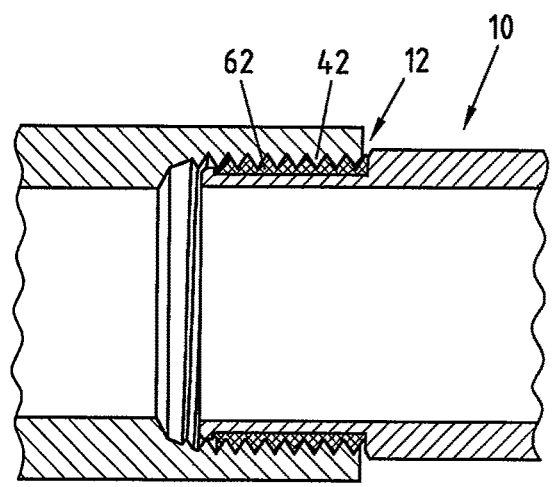
FIG. 17 the fitting from FIG. 13 mounted on a threaded connection in the pressed state.
Figure 18:
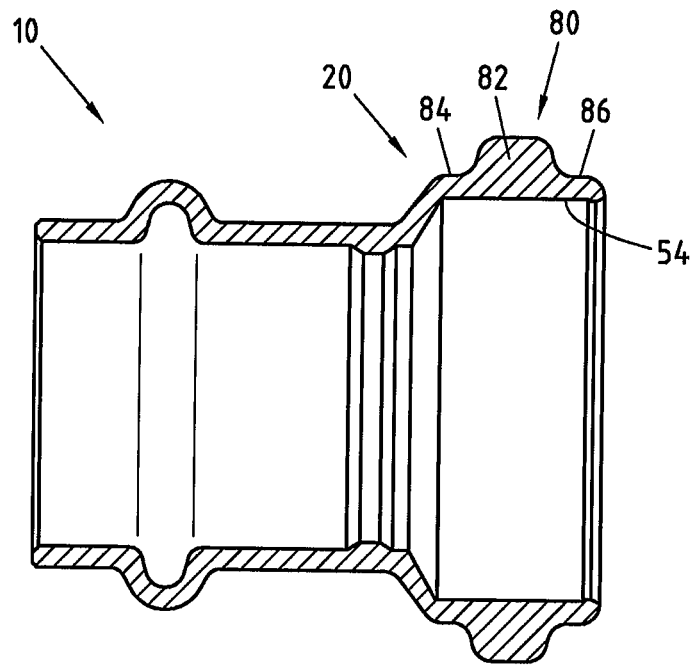
FIG. 18 a fifth embodiment of a fitting according to the invention with a threaded portion with internal thread in cross section with a different external profile of the pressing surface of the base body, compared with the third embodiment.

As shown in FIG. 15, prior to screwing the fittings 10 into the thread 42 the expansion tool 70, consisting of an expansion sleeve 72 and a die 74 with a flared end 76 is pushed through the fitting 10. Then the fitting 10 together with the expansion tool 70 is screwed into the thread 42, until the sealing body 62 is disposed in the area of the thread 42. According to FIG. 16 the die 74 is then withdrawn from the fitting 10 and from the expansion sleeve 72 secured therein in a releasable manner. In doing so the flared end 76 of the threaded portion 22 runs along the pressing surface 66 and pushes the threaded portion 22 radially outwards. In this way the sealing body 62 is pressed securely against the thread 42 and a reliable and tight connection between the fitting 10 and the threaded connection 12 is created, as shown in FIG. 17.

As can be seen from the description of FIGS. 1 to 17, the pressing surface 26; 66 of the base body 20 has a substantially cylindrical profile. Thus radially inward working pressing tools, for example crimping tools, can be used, having a press profile having at least one section which can be brought into engagement with the cylindrical profile of the pressing surface 26. Here the cylindrical section of the press profile can be part of a more complex press profile. It is important here that the pressing surface 26 being suited to the tool used such that the latter allows successful pressing of the fitting 10 without alteration.

FIGS. 18 to 22 show a fifth embodiment of a fitting 10 according to the invention, which with regard to the arrangement of the recess 54 and the sealing body 56 with internal thread 58 is the same as the third embodiment according to FIGS. 9 to 12.

The fifth embodiment now has a pressing surface 80 that differs from the cylindrical pressing surface of the third embodiment, which is explained in the following and similarly can be used with all embodiments according to FIGS. 1 to 12 instead of the cylindrical pressing surface 26.

Figure 19:
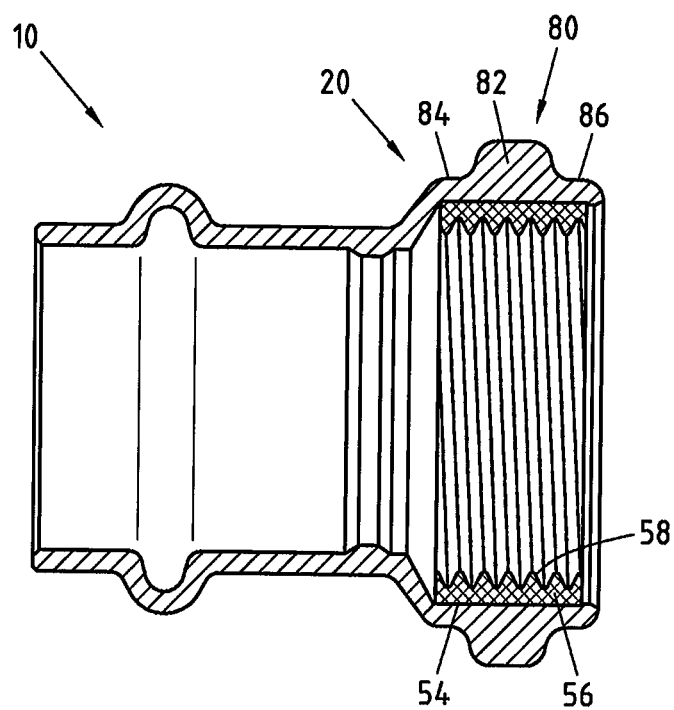
FIG. 19 the fitting from FIG. 18 with sealing body used.

In the fifth embodiment the pressing surface 80 of the base body 20 has a circumferential, solid bead 82. The bead 82 can be identified in particular in FIGS. 18 and 19, wherein in FIG. 18 the sealing body 56 has been omitted, whereas FIG. 19 shows the sealing body 56 with internal thread 58 positioned in the recess 54. The bead 82 is adjoined on both sides by substantially cylindrical surfaces 84 and 86.

Figure 20:
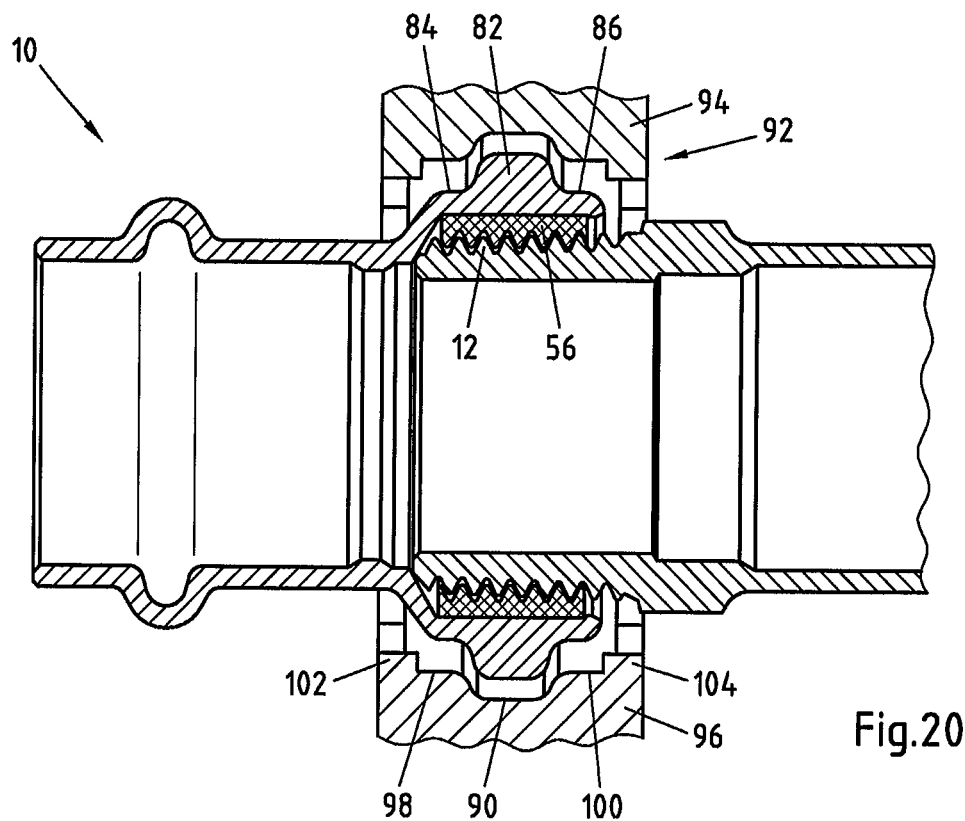
FIG. 20 the fitting from FIG. 19 mounted on a threaded connection in the unpressed state in cross section with pressing tool applied.

In FIG. 20 the fitting 10 is mounted on the threaded connection 12, without first fully sealing the connection between fitting 10 and thread 12. In addition, the bead 82 is adapted to a circumferential recess 90 of a press profile of a pressing tool 92. It is a conventional pressing tool, in which two articulated pressing jaws 94 and 96 surround the fitting 10, wherein the pressing jaws 94 and 96 are shown only partially in FIG. 20.

The pressing jaws 94 and 96 have a press profile with the abovementioned recess 90, two adjoining cylindrical surfaces 98 and 100 and furthermore adjoining polygonal elements 102 and 104. During pressing of a conventional press fitting the polygonal elements 102 and 104 provide a polygonal impression, to ensure torsion resistance between the fitting and the pipe securely attached to it. During pressing the recess 90 serves to deform a correspondingly designed bead with internal sealant, such as for example an O-ring, in such a way that a sealed connection between fitting and pipe results. Since during pressing it is important that the deformation of the bead is as precise as possible, the dimensions of the circumferential recess 90 are specified exactly.

FIG. 20 shows the state prior to pressing, in which the bead 82 is still disposed spaced away from the recess 90. There are also other sections of the pressing surface 80 not resting against the press profile of the pressing jaws 94 and 96.

Figure 21:
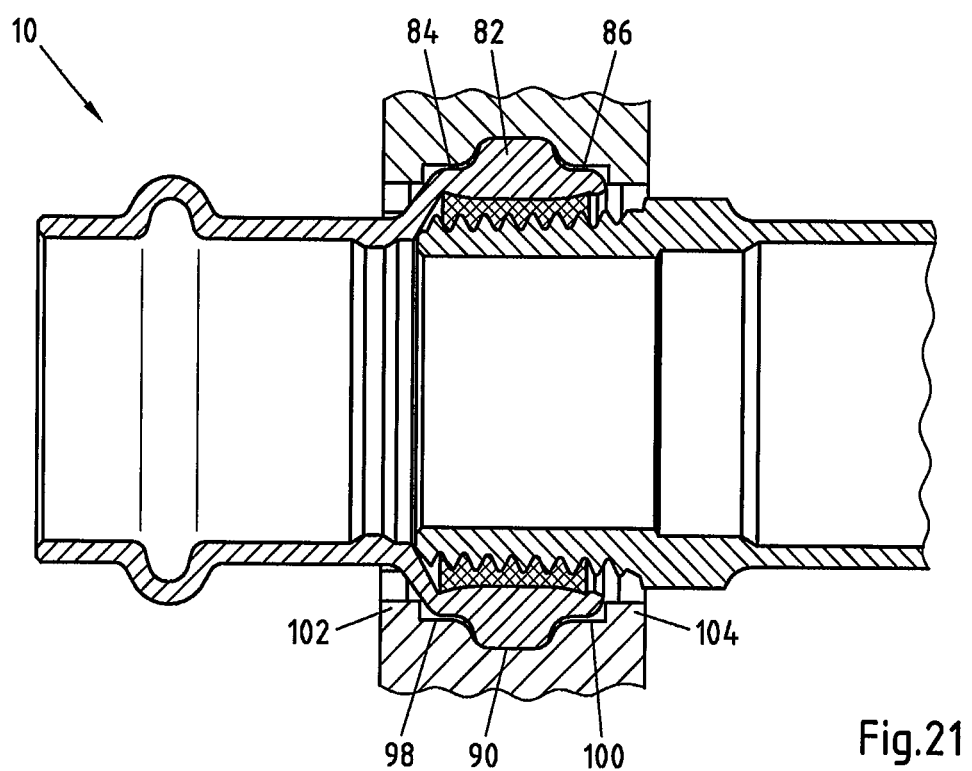
FIG. 21 the fitting from FIG. 19 mounted on a threaded connection in the pressed state in cross section with pressing tool applied.

FIG. 21 now shows the state during pressing or after pressing, in which the pressing jaws 94 and 96 are still resting against the fitting 10. In this state the recess 90 rests against the bead 82 and has pressed the bead 82 circumferentially radially inwards and thus permanently deformed it. Conversely, the cylindrical sections 84 and 86 of the fitting 10 do not rest against the pressing jaw sections 98 and 100, so that no force acts in these areas and no deformation of the fitting 10 is brought about. Also, the polygonal elements 102 and 104 do not rest against the press profile 80. Thus only the area of the bead 82 is deformed inwards and the radially internal section of the sealing body 56 is evenly deformed, so that a fixed and permanent seal between the fitting 10 and the thread 12 is achieved.

Figure 22:
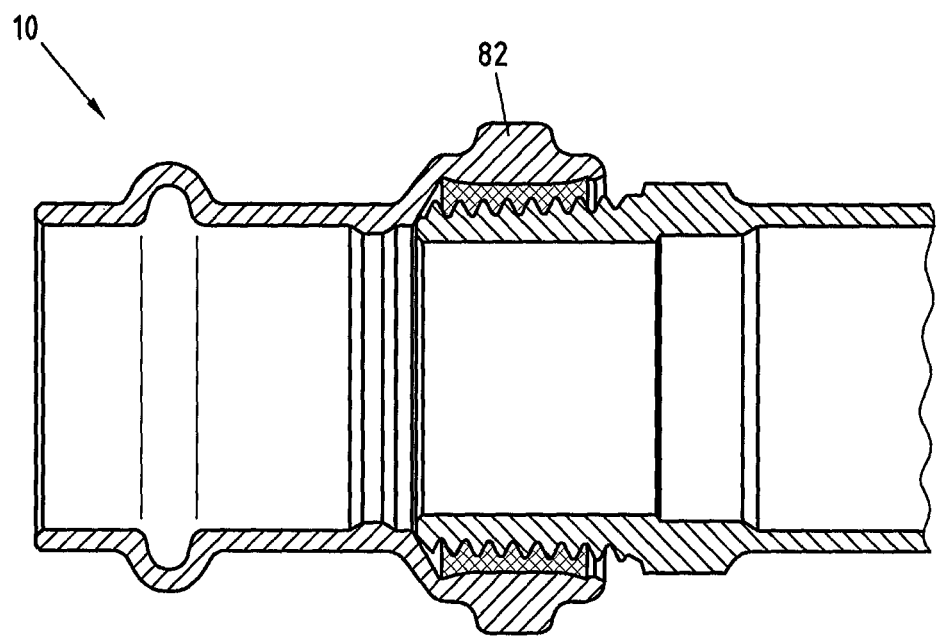
FIG. 22 the fitting from FIG. 19 mounted on a threaded connection in the pressed state in cross section.

Finally, FIG. 22 shows the finished pressed state of the fitting 10 with bead 82 without pressing tool.

The design of the fitting 10 with bead 82 has the advantage that only the recess 90 of the pressing jaws 94 and 96 is used for the deformation of the fitting 10. The dimensions of the recess 90 are precisely specified for the conventional pressing tasks, whereas the dimensions of the other sections of the press profile are not specified or set with such accuracy. Thus a precise pressing result for the fitting 10 is achieved without the pressing tool having to be specially adapted for pressing the fitting 10 according to the invention.

Figure 23:
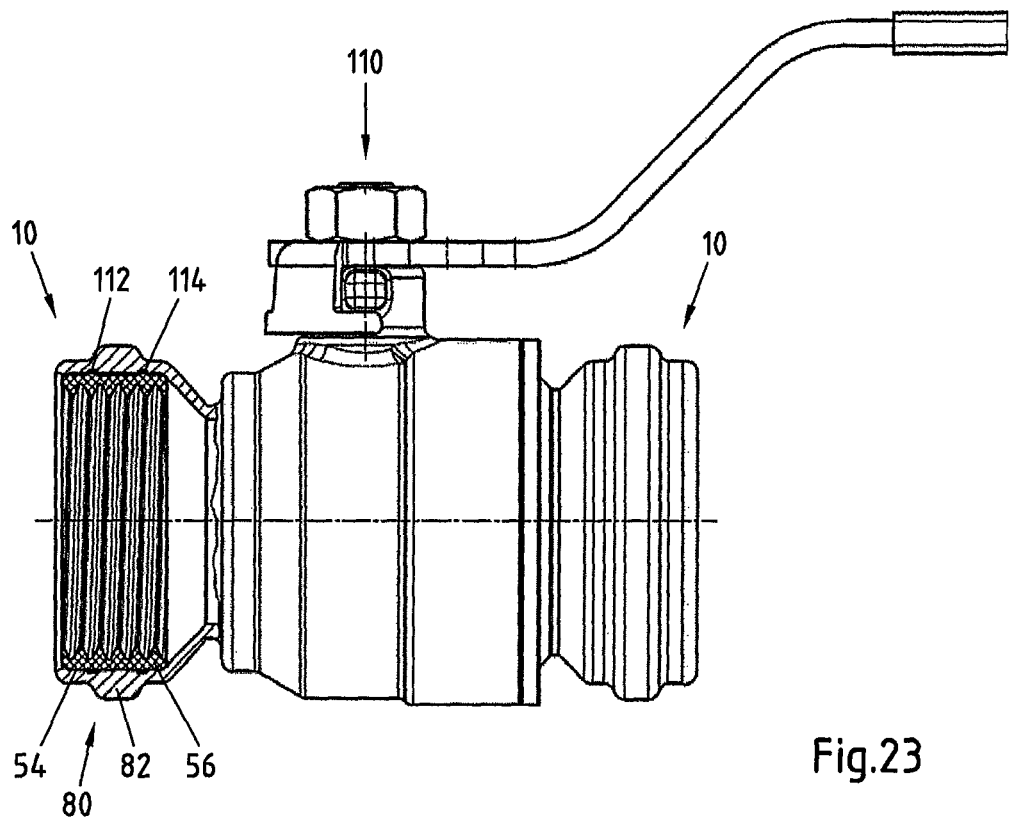
FIG. 23 the fitting from FIGS. 19 to 22 in direct connection with an armature in the form of a ball valve.

FIG. 23 shows the fitting 10 described above according to FIGS. 18 to 22 in a direct connection to an armature in the form of a ball valve 110, the operation of which does not need to be described in detail. The fitting 10 similarly has the bead 82 described above of the pressing surface 80, so that a pipe or another armature with an external thread can be connected with the fitting 10 or ball valve 110 in the manner described above.

In this embodiment the fitting 10 can also be produced by metal forming, such that the entire armature comprising ball valve and pipe section is cheap to manufacture.

As FIG. 23 shows, the ball valve 100 has on both sides a fitting 10 according to the invention. In addition, it is possible for the ball valve 110 to have a fitting 10 according to the invention on one side and a normal press fitting on the other side.

In addition to the configuration according to FIGS. 18 to 22, the internal profile of the recess 54 has two grooves 112 and 114, which during screwing in of the internal threads intensifies a tilting of the material of the sealing body 56, in order to allow improved resistance to torsion of the sealing body 56 relative to the recess 54 of the fitting.

The invention claimed is:
1. A fitting for attaching to a threaded connection of a pipe or to an armature, comprising:
   a base body,
   a threaded portion and
   a sealing body disposed on the threaded portion,
   wherein the base body has a pressing surface on the side situated opposite to the threaded portion,
   wherein the sealing body has a cylindrical basic form and extends at least along one turn of the thread of the threaded connection to be sealed,
   wherein at least a portion of the sealing body is provided with a thread, and
   wherein the base body is configured to be pressed on the pressing surface on the side of the base body radially opposite to the threaded portion, once the base body is attached to the threaded connection.
2. The fitting according to claim 1, wherein the threaded portion has a thread comprising at least partially the same material as the base body.
3. The fitting according to claim 2, wherein the threaded portion has a circumferential groove for accommodating the sealing body.
4. The fitting according to claim 3, wherein the threaded portion has a recess for accommodating the thread of the sealing body.
5. The fitting according to claim 1, wherein the pressing surface of the base body has a circumferential bead.
6. The fitting according to claim 5, wherein the bead is adapted to a circumferential recess of a press profile of a pressing tool.
7. The fitting according to claim 5, wherein the bead is solid.
8. The fitting according to claim 1, wherein a connection between a thread of the threaded portion and a thread of the threaded connection is untight in a mounted and unpressed state.
9. The fitting according to claim 1, wherein the thread is an internal thread.
10. The fitting according to claim 1, wherein the thread is an external thread.
11. The fitting according to claim 1, wherein the pressing surface of the base body has a substantially cylindrical profile.
12. The fitting according to claim 1, wherein the sealing body extends along two turns of the thread of the threaded connection to be sealed.
13. A method for attaching a fitting to a threaded connection of a pipe, comprising:
   connecting a threaded portion of the fitting and the thread of the threaded connection by threading;
   disposing a sealing body on the threaded portion prior to connecting the threaded portion of the fitting and the thread of the threaded connection, wherein the sealing body is positioned at least partially in the area of the thread of the threaded connection, wherein the sealing body has a cylindrical basic form and extends at least along one turn of the thread of the threaded connection to be sealed, and wherein at least a portion of the sealing body is provided with a thread; and,
   pressing on a pressing surface on a side of a base body of the fitting radially opposite to the threaded portion.
14. The method according to claim 13, wherein
   the threaded portion includes an internal thread, and wherein
   the threaded portion is displaced radially inwards by a crimping tool applied to the pressing surface.
15. The method according to claim 13, wherein
   the threaded portion includes an external thread, and wherein the threaded portion is displaced radially outwards by an expansion tool applied to the pressing surface.

* * * * *